US012679975B2

(12) United States Patent
Todoroki et al.

(10) Patent No.: US 12,679,975 B2
(45) Date of Patent: Jul. 14, 2026

(54) MILLABLE-TYPE SILICONE RUBBER COMPOSITION AND SILICONE RUBBER CURED PRODUCT

(71) Applicant: SHIN-ETSU CHEMICAL CO., LTD., Tokyo (JP)

(72) Inventors: Daichi Todoroki, Takasaki (JP); Tsutomu Nakamura, Annaka (JP); Tomohiko Sutou, Takasaki (JP); Naoki Nakamura, Annaka (JP); Masanobu Nishimine, Takasaki (JP); Tomoya Ogata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 595 days.

(21) Appl. No.: 18/036,211

(22) PCT Filed: Nov. 5, 2021

(86) PCT No.: PCT/JP2021/040730
§ 371 (c)(1),
(2) Date: May 10, 2023

(87) PCT Pub. No.: WO2022/113696
PCT Pub. Date: Jun. 2, 2022

(65) Prior Publication Data
US 2023/0407011 A1     Dec. 21, 2023

(30) Foreign Application Priority Data
Nov. 27, 2020     (JP) ................................. 2020-197368

(51) Int. Cl.
| | |
|---|---|
| *C08L 83/04* | (2006.01) |
| *C08G 77/08* | (2006.01) |
| *C08G 77/12* | (2006.01) |
| *C08G 77/20* | (2006.01) |
| *C08K 3/36* | (2006.01) |
| *C08K 5/14* | (2006.01) |
| *C08K 9/06* | (2006.01) |

(52) U.S. Cl.
CPC .............. *C08L 83/04* (2013.01); *C08G 77/08* (2013.01); *C08G 77/12* (2013.01); *C08G 77/20* (2013.01); *C08K 3/36* (2013.01); *C08K 5/14* (2013.01); *C08K 9/06* (2013.01)

(58) Field of Classification Search
CPC ....................................................... C08L 83/04
See application file for complete search history.

(56) References Cited

U.S. PATENT DOCUMENTS

| | | | |
|---|---|---|---|
| 5,109,094 | A | 4/1992 | Rees et al. |
| 5,449,735 | A | 9/1995 | Inoue et al. |
| 6,331,588 | B1 | 12/2001 | Azechi et al. |
| 10,729,405 | B2 | 8/2020 | Nakai et al. |

| | | | | |
|---|---|---|---|---|
| 2002/0095009 | A1 | 7/2002 | Sato et al. | |
| 2013/0331821 | A1 | 12/2013 | Okada et al. | |
| 2018/0360416 | A1 | 12/2018 | Nakai et al. | |
| 2019/0359872 | A1* | 11/2019 | Yoo .......................... | C09K 5/00 |
| 2021/0292556 | A1 | 9/2021 | Kato | |

FOREIGN PATENT DOCUMENTS

| | | | | |
|---|---|---|---|---|
| CN | 1621447 | A | 6/2005 | |
| CN | 101942203 | A | 1/2011 | |
| CN | 103492491 | A | 1/2014 | |
| CN | 106189251 | A | 12/2016 | |
| EP | 0314396 | A2 | 5/1989 | |
| JP | H01-108238 | A | 4/1989 | |
| JP | H02-235931 | A | 9/1990 | |
| JP | 04311764 | A * | 11/1992 | |
| JP | H04-311764 | A | 11/1992 | |
| JP | H06-136270 | A | 5/1994 | |
| JP | H07-26020 | A | 1/1995 | |
| JP | 2748215 | B2 * | 5/1998 | ............. C08G 77/34 |
| JP | H11-116739 | A | 4/1999 | |
| JP | H11-228745 | A | 8/1999 | |
| JP | 2000-351901 | A | 12/2000 | |
| JP | 2002-167502 | A | 6/2002 | |

(Continued)

OTHER PUBLICATIONS

Machine translation of JP 4-311764 (no date).*
Machine translation of JP 2011-016977 (no date).*
Nov. 7, 2023 Notification of Reasons for Refusal issued in Japanese Patent Application No. 2020-197368.
Jun. 20, 2023 Office Action issued in Japanese Patent Application No. 2020-197368.
Feb. 19, 2025 Office Action issued in Chinese Patent Application No. 202180076629.2.
Mar. 6, 2025 Office Action issued in Taiwanese Patent Application No. 110141802.

(Continued)

*Primary Examiner* — Marc S Zimmer
(74) *Attorney, Agent, or Firm* — Oliff PLC

(57)          ABSTRACT

A millable-type silicone rubber composition, including: (A) 100 parts by mass of an organopolysiloxane represented by following average composition formula (1), the organopolysiloxane having polymerization degree of 100 or more, wherein a content of a low molecular siloxane contained as an impurity and having a polymerization degree of 10 or less is less than 1,000 ppm; (B) 5 to 100 parts by mass of a treated silica treated with a vinyl group-containing alkoxysilane and/or a vinyl group-containing organosilazane, the treated silica having a hydrophobicity degree of 40 or more; and (C) an effective amount of a curing agent. This provides a millable-type silicone rubber composition that yields a silicone rubber cured product with: a total of low molecular siloxane components having polymerization degree of 10 or less of less than 1,000 ppm; a small change in plasticity degree of the silicone rubber compound; and a small compression set.

$$R1aSiO(4-a)/2 \qquad (1)$$

16 Claims, No Drawings

(56) References Cited

FOREIGN PATENT DOCUMENTS

| | | | |
|----|----------------|---|---------|
| JP | 2002-179920 A | | 6/2002 |
| JP | 2004-182908 A | | 7/2004 |
| JP | 2005-146029 A | | 6/2005 |
| JP | 2007-153991 A | | 6/2007 |
| JP | 2009-173837 A | | 8/2009 |
| JP | 2011016977 A | * | 1/2011 |
| JP | 2013-103991 A | | 5/2013 |
| JP | 2014-109014 A | | 6/2014 |
| JP | 2018-129467 A | | 8/2018 |
| JP | 2018-131482 A | * | 8/2018 |
| JP | 2019-031600 A | | 2/2019 |
| JP | 2019-210338 A | | 12/2019 |
| WO | 2012/115139 A1 | | 8/2012 |
| WO | 2014/050318 A1 | | 4/2014 |
| WO | 2015/005221 A1 | | 1/2015 |
| WO | 2019/225178 A1 | | 11/2019 |
| WO | 2020/132020 A1 | | 6/2020 |

OTHER PUBLICATIONS

Jul. 7, 2025 Office Action issued in Chinese Patent Application No. 202180076629.2.
Dec. 28, 2021 International Search Report issued in International Patent Application No. PCT/JP2021/040730.
May 30, 2023 International Preliminary Report on Patentability issued in International Patent Application No. PCT/JP2021/040730.
Oct. 2, 2024 Extended European Search Report issued in European Patent Application No. 21897672.8.
Nov. 13, 2025 Office Action issued in Chinese Patent Application No. 202180076629.2 (with partial translation).

* cited by examiner

MILLABLE-TYPE SILICONE RUBBER COMPOSITION AND SILICONE RUBBER CURED PRODUCT

TECHNICAL FIELD

The present invention relates to a millable-type silicone rubber composition and a silicone rubber cured product.

BACKGROUND ART

Since silicone rubbers typically have excellent weather resistance, durability, heat resistance, and colorability, and have physiological inactivity, the silicone rubbers are used in various fields such as construction materials, electric and electronic parts, office apparatuses, automobile parts, and medical instruments.

As a method for manufacturing a linear organopolysiloxane used as a raw material of the silicone rubber, known is a method of polymerizing a low molecular-weight cyclic or linear organopolysiloxane by using an acidic or basic catalyst with utilizing an equilibrium reaction. However, this polymerization method simultaneously generates and cleaves a siloxane bond, resulting in an obtained high molecular-weight linear organopolysiloxane containing a large amount of a low molecular-weight cyclic siloxane (hereinafter, low-molecular siloxane).

In the current chemical regulation, accumulativity is commonly evaluated with Bioconcentration Factor (BCF) Although collecting data under an actual environment can more accurately evaluate accumulativity in the natural world, many chemicals are needed to be evaluated. In terms of labor and cost, the laboratory data, BCF, is used as an index of the accumulativity.

The BCF is a method for testing a degree of accumulativity of a chemical in fish in water, and an experiment is performed under a constant concentration of the chemical. Thus, it is unsuitable method for evaluating accumulativity of a water-hardly soluble substance and highly volatile substance. Although a tetramer, pentamer, and hexamer of the low molecular siloxane (D4-6) have been found to have low accumulativity under an actual environment and almost no toxicity, such low molecular siloxanes exhibit high BCF values and are regulated.

In Europe, D4-6 are designated as Substances of Very High Concern (SVHC). D5, which had had sufficient data in Japan, was not designated as the monitoring chemical substance, but D4 and D6, which had insufficient data, were designated as the monitoring chemical substance. In such a worldwide trend of the chemical regulation, the molecular siloxane is required to be reduced.

Patent Document 1 discloses a method of obtaining a polymer by: adding a hydroxide selected from magnesium hydroxide, calcium hydroxide, strontium hydroxide, and barium hydroxide into an organopolysiloxane having at least one hydroxy group at a molecular terminal; and performing a polycondensation reaction. This method, however, yields a product having a low polymerization degree, and it is difficult to obtain a raw-rubber substance.

Patent Document 2 discloses a method of obtaining a polymer by: adding a silane or siloxane having a bifunctional dialkylaminosilyl group into an organopolysiloxane, triorganosilanol, etc. having silanol groups at both terminals of the molecular chain; and performing a polycondensation reaction. This method, however, yields a byproduct of an amino compound that is difficult to be removed during neutralization, and the amino compound remains in the product. Thus, the method has a problem of smell derived from the byproduct of the amino compound.

Patent Document 3 describes a silicone rubber composition with a low content of a volatile low molecular siloxane. However, the content of the low molecular siloxane is a degree so as not to cause contact failure at an electric contact due to the siloxane, and it is limited to an organic peroxide.

Meanwhile, among silicone rubber compositions, referred to as, for example, a millable-type silicone rubber composition are those that have a state before curing similar to an unvulcanized compound rubber of natural rubber or common synthetic rubber and that can be plasticized and mixed with kneading roller or a sealed mixer. One of important characteristics of the millable-type silicone rubber composition is roller processability. During kneading, for example, a composition having more excellent roller processability can be favorably kneaded with hardly adhering to a roller, etc. From the viewpoint of operability, the millable-type silicone rubber composition is desired to have excellent roller processability.

Patent Document 4 discloses a silicone rubber composition with a low content of a low molecular siloxane component having a polymerization degree of 20 or less. This composition has a kinetic viscosity at 25° C. of 100 to 10,000 mm$^2$/s, and uses a polymer in which the chain is extended by a hydrosilylation reaction between: an organopolysiloxane having alkenyl groups at both molecular terminals; and hydrosilyl groups in an organopolysiloxane having two hydrosilyl groups in one molecule. However, Patent Document 4 has no description on roller processability of the composition.

Patent Document 5 discloses a silicone rubber composition with a low molecular siloxane content having a polymerization degree of 10 or less of 2,000 ppm or less. Since using (HO)R$_2$SiOSiR$_2$(OH), the composition is not economical.

CITATION LIST

Patent Literature

Patent Document 1: JP H02-235931 A
Patent Document 2: JP H07-026020 A
Patent Document 3: JP H06-136270 A
Patent Document 4: JP H04-311764 A
Patent Document 5: JP 2011-016977 A

SUMMARY OF INVENTION

Technical Problem

Many methods for distilling off a low molecular siloxane from an oily or raw-rubber organopolysiloxane are known. However, a surface treatment agent is needed to be added with adding silica as a reinforcing material, which may allow a low molecular siloxane derived from the surface treatment agent to be contained.

Although using a silica in which the low molecular siloxane derived from the surface treatment agent is previously removed from the surface-treated silica eliminates the effect of the low molecular siloxane derived from the surface treatment agent, characteristics such as compression set is not satisfactory.

The present invention has been made in view of the above circumstances. An object of the present invention is to provide a millable-type silicone rubber composition that yields a silicone rubber cured product with: a total of a low molecular siloxane component having a polymerization degree of 10 or less of less than 1,000 ppm; a small change in a plasticity degree of the silicone rubber compound; and a small compression set.

Solution to Problem

To solve the above problem, the present invention provides a millable-type silicone rubber composition, comprising:

(A) 100 parts by mass of an organopolysiloxane represented by the following average composition formula (1), the organopolysiloxane having at least two alkenyl groups in one molecule and having a polymerization degree of 100 or more, wherein a content of a low molecular siloxane contained as an impurity and having a polymerization degree of 10 or less is less than 1,000 ppm;

$$R^1{}_a SiO_{(4-a)/2} \qquad (1),$$

wherein $R^1$ is identical to or different from each other, and represents an unsubstituted or substituted monovalent hydrocarbon group, and "a" represents a positive number of 1.95 to 2.05, (B) 5 to 100 parts by mass of a treated silica treated with a vinyl group-containing alkoxysilane and/or a vinyl group-containing organosilazane, the treated silica having a hydrophobicity degree of 40 or more; and (C) an effective amount of a curing agent.

Such a millable-type silicone rubber composition can yield the silicone rubber cured product with: the total of the low molecular siloxane component contained as an impurity and having a polymerization degree of 10 or less of less than 1,000 ppm; a small change in a plasticity degree of the silicone rubber compound; and a small compression set.

In the present invention, the component (B) can be the treated silica treated with the vinyl group-containing alkoxysilane and/or the vinyl group-containing organosilazane, a content of the vinyl group being 0.0001 mol or more relative to 100 parts by mass of the silica.

Such a treated silica can yield the silicone rubber cured product having a small compression set.

In the present invention, the component (C) can be an addition-reaction curing agent being a combination of an organohydrogenpolysiloxane and a hydrosilylation catalyst.

Such a curing agent is preferable for a food-contact use.

In the present invention, the component (C) can be an organic peroxide curing agent.

Such a curing agent is preferable for an electric wire, etc.

In addition, the present invention provides a silicone rubber cured product comprising a cured product of the above millable-type silicone rubber composition.

Such a silicone rubber cured product yields a cured product with a low amount of the low molecular siloxane component and a good compression set.

In the present invention, a total of the low molecular siloxane component contained in the cured product and having a polymerization degree of 10 or less can be less than 1,000 ppm.

Such a silicone rubber cured product has a lower amount of the low molecular siloxane component, which complies with the requirement of the chemical regulation.

In the present invention, a mixture in which the components (A) and (B) are blended and before blending the curing agent is referred to as the (millable-type) silicone rubber compound, and a mixture in which the curing agent is blended with this compound is referred to as the (millable-type) silicone rubber composition.

Advantageous Effects of Invention

As noted above, the inventive millable-type silicone rubber composition can yield the silicone rubber cured product with: the total of the low molecular siloxane component contained as an impurity and having a polymerization degree of 10 or less of less than 1,000 ppm; a small change in a plasticity degree of the silicone rubber compound; and a small compression set.

In addition, the present invention provides a silicone rubber cured product comprising a cured product of the millable-type silicone rubber composition.

DESCRIPTION OF EMBODIMENTS

As noted above, there have been demands for development of a millable-type silicone rubber composition that yields a silicone rubber cured product that: further complies with the chemical regulation; has reduced volatile component remained in the product; hardly causes contact failure at an electric contact; has a total of the low molecular siloxane component having a polymerization degree of 10 or less of less than 1,000 ppm; has small change in plasticity degree of the silicone rubber compound; and has small compression set.

The present inventors have earnestly studied the above problems, and consequently found that a millable-type silicone rubber composition comprising: an organopolysiloxane having at least two alkenyl groups in one molecule and having a polymerization degree of 100 or more, wherein a content of a low molecular siloxane contained as an impurity and having a polymerization degree of 10 or less is less than 1,000 ppm; a treated silica treated with a vinyl group-containing alkoxysilane and/or a vinyl group-containing organosilazane, the treated silica having a hydrophobicity degree of 40 or more; and a curing agent can yield a millable-type silicone rubber composition that yields a silicone rubber cured product with: a total of a low molecular siloxane component having a polymerization degree of 10 or less of less than 1,000 ppm; a small change in a plasticity degree of the silicone rubber compound; and the small compression set. This finding has led to complete the present invention.

Specifically, the present invention is a millable-type silicone rubber composition, comprising:

(A) 100 parts by mass of an organopolysiloxane represented by the following average composition formula (1), the organopolysiloxane having at least two alkenyl groups in one molecule and having a polymerization degree of 100 or more, wherein a content of a low molecular siloxane contained as an impurity and having a polymerization degree of 10 or less is less than 1,000 ppm;

$$R^1{}_a SiO_{(4-a)/2} \qquad (1),$$

wherein $R^1$ is identical to or different from each other, and represents an unsubstituted or substituted monovalent hydrocarbon group, and "a" represents a positive number of 1.95 to 2.05, (B) 5 to 100 parts by mass of a treated silica treated with a vinyl group-containing alkoxysilane and/or a vinyl group-containing organosilazane, the treated silica having a hydrophobicity degree of 40 or more; and (C) an effective amount of a curing agent.

Hereinafter the present invention will be described in detail, but the present invention is not limited thereto.

Component (A)

In the present invention, the component (A) is a main component (base polymer) in the millable-type silicone rubber composition, and is an organopolysiloxane represented by the following average composition formula (1) and having at least two alkenyl groups in one molecule and having a polymerization degree of 100 or more, wherein a content of a low molecular siloxane contained as an impurity and having a polymerization degree of 10 or less is less than 1,000 ppm, $$R^1_a SiO_{(4-a)/2} \tag{1}$$

wherein $R^1$ is identical to or different from each other, and represents an unsubstituted or substituted monovalent hydrocarbon group, and "a" represents a positive number of 1.95 to 2.05.

In the average composition formula (1), $R^1$ is identical to or different from each other, and represents an unsubstituted or substituted monovalent hydrocarbon group. The monovalent hydrocarbon group typically preferably has 1 to 12 carbon atoms, particularly preferably 1 to 8 carbon atoms. Specific examples thereof include: alkyl groups, such as a methyl group, an ethyl group, a propyl group, a butyl group, a hexyl group, and an octyl group; cycloalkyl groups, such as a cyclopentyl group and a cyclohexyl group; alkenyl groups, such as a vinyl group, an allyl group, a propenyl group, a butenyl group, and a hexenyl group; cycloalkenyl groups, such as a cyclohexenyl group; aryl groups, such as a phenyl group and a tolyl group; aralkyl groups, such as a benzyl group and a 2-phenylethyl group; and groups in which a part or all of hydrogen atoms in these groups are substituted with a halogen atom, such as a fluorine and chlorine, or a cyano group, for example, a chloromethyl group, a trifluoropropyl group, and a cyanoethyl group. Among these, a methyl group, a vinyl group, a phenyl group, and a trifluoropropyl group are preferable, and a methyl group and a vinyl group are particularly preferable.

In particular, the organopolysiloxane as the component (A) preferably has two or more, typically 2 to 50, particularly approximately 2 to 20 aliphatic unsaturated groups, such as alkenyl groups and cycloalkenyl groups in one molecule, and particularly preferably has vinyl groups. In this case, 0.01 to 20 mol %, particularly 0.02 to 10 mol %, of all $R^1$ are preferably the aliphatic unsaturated groups. This aliphatic unsaturated group may be bonded to a silicon atom at the terminal of the molecular chain, may be bonded to a silicon atom in the molecular chain (non-terminal of the molecular chain), or may be both of them, but preferably bonded to at least a silicon atom at the terminal of the molecular chain.

In addition, 80 mol % or more, preferably 90 mol % or more, more preferably 95 mol % or more, further preferably all $R^1$ except for the aliphatic unsaturated group, in all $R^1$ are desirably alkyl groups, particularly methyl groups.

"a" represents a positive number of 1.95 to 2.05, preferably 1.98 to 2.02, more preferably 1.99 to 2.01.

The organopolysiloxane of the component (A) preferably has a linear or partially branched linear molecular structure. Specifically, preferable are: a repeating structure in which a diorganosiloxane unit ($R^1_2SiO_{2/2}$, wherein $R^1$ represents the same as above, the same applies hereinafter) constituting the main chain of the organopolysiloxane is composed of the repetition of only a dimethylsiloxane unit; a structure in which a diorganosiloxane unit such as a diphenylsiloxane unit, a methylphenylsiloxane unit, a methylvinylsiloxane unit, and a methyl-3,3,3-trifluoropropylsiloxane unit having a substituent such as a phenyl group, a vinyl group, and a 3,3,3-trifluoropropyl group, are introduced as a part of the dimethylpolysiloxane structure composed of the repetition of this dimethylsiloxane unit constituting the main chain; or the like.

Both the terminals of the molecular chain are preferably blocked with triorganosiloxy groups ($R^1_3SiO_{1/2}$), such as, for example, trimethylsiloxy groups, dimethylphenylsiloxy groups, vinyldimethylsiloxy groups, divinylmethylsiloxy groups, and trivinylsiloxy groups.

Such an organopolysiloxane can be obtained by, for example, (co-)hydrolytic condensation of one or more kinds of an organohalogenosilane, or by ring-opening polymerization of a cyclic polysiloxane (a trimer or tetramer of a siloxane, etc.) using an alkaline or acidic catalyst.

A polymerization degree of the organopolysiloxane is 100 or more (typically 100 to 100,000), preferably 1,000 to 100,000, more preferably 2,000 to 50,000, and particularly preferably 3,000 to 20,000. The organopolysiloxane preferably has no self-fluidity at a room temperature (25° C.), which is a so-called raw rubber (non-liquidus). If the polymerization degree is less than 100, the compound has problems such as adhesion to a roller, resulting in deterioration in the roller operability. This polymerization degree can be determined as an average polymerization degree from a weight-average molecular weight in terms of polystyrene by gel permeation chromatography (GPC) analysis measured under the following condition.

Measurement Condition

Developing solvent: Tetrahydrofuran (THF)

Flow rate: 0.6 mL/min

Detector: Differential refractive index detector (RI)

Column: TSK Guardcolumn SuperH-L

TSKgel SuperH4000 (6.0 mm I.D.×15 cm×1)

TSKgel SuperH3000 (6.0 mm I.D.×15 cm×1)

TSKgel SuperH2000 (6.0 mm I.D.×15 cm×2)

(All the above are manufactured by Tosoh Corporation.)

Column temperature: 40° C.

Injection amount of sample: 20 μL (THF solution at a concentration of 0.5 mass %)

The component (A) may be used singly, or may be a mixture of two or more kinds thereof having different molecular weights (polymerization degrees) or molecular structures. The organopolysiloxane also has a feature of a content of the low molecular siloxane having a polymerization degree of 10 or less of less than 1,000 ppm. The content is preferably 700 ppm or less, and more preferably 400 ppm or less (in terms of mass). A lower content of the low molecular siloxane having a polymerization degree of 10 or less is more preferable. A lower limit thereof is not particularly limited, and can be 10 ppm or more, for example. A content of the low molecular siloxane of 1,000 ppm or more is likely to cause contact failure, and causes an environmental problem, which is unfavorable. In the present invention, the content of the low molecular siloxane having a polymerization degree of 10 or less is measured by gas chromatography under the following condition with n-tetradecane as an internal standard.

Measurement Condition

Apparatus: Gas chromatograph Nexis GC-2030, manufactured by SHIMADZU CORPORATION Fluid: Air, hydrogen, and helium Flow rate: 0.6 mL/min Detector: Flame ionization detector Column: DB-5MS (All the above are manufactured by SHIMADZU COR-
      PORATION.)

Column Temperature: 320° C.

Injection amount of sample: 1.0 μL

Known are various methods for removing the low molecular siloxane having a polymerization degree of 10 or less from the organopolysiloxane, and examples thereof include heating distillation, vacuum distillation, and thin-film distillation. Although a reduced pressure at higher temperature is more preferable to efficiently remove the low molecular siloxane, a too high temperature causes cracking of the organopolysiloxane. Thus, the low molecular siloxane is preferably removed at 100 to 300° C.

Component (B)

The component (B) is a treated silica having a hydrophobicity degree of 40 or more, preferably 50 to 70, and treated with a vinyl group-containing alkoxysilane and/or a vinyl group-containing organosilazane (alkenyl group-containing organosilane).

If the component (B) is absent, the silicone rubber compound has a large change in a plasticity, or the silicone rubber cured product has a large compression set.

If the hydrophobicity degree of the treated silica is less than 40, the silicone rubber compound has a large plasticity setback, or blending the treated silica with the organopolysiloxane becomes difficult.

In the present invention, the hydrophobicity degree is an index indicating a degree of hydrophobic surface treatment on a silica surface, and is referred to a value measured by the following methanol titration.

<Method for Measuring Hydrophobicity Degree (Methanol Titration)>

Into a 200-mL beaker, 50 mL of pure water is poured, 0.2 g of a sample is added, and the mixture is stirred with a magnetic stirrer. A tip of a burette charged with methanol is sank into the liquid, methanol is added dropwise with stirring, and the hydrophobicity degree is obtained by the following formula where an addition amount of methanol required for completely dispersing the sample in the water is Y mL.

$$\text{Hydrophobicity Degree} = \{Y/(50+Y)\} \times 100$$

The treated silica of the component (B) is desirably treated with the vinyl group-containing alkoxysilane and/or the vinyl group-containing organosilazane, a content of the vinyl group being 0.0001 mol or more relative to 100 parts by mass of the silica. An upper limit of the amount of the vinyl group is not particularly limited, and can be 0.1 mol or less, for example. When 0.0001 mol or more of the vinyl group is added, the cured product has a good compression set.

The treated silica can be obtained by, for example: adding a fumed silica into a high-speed mixer; rotating the mixer; spraying a hydrophobing agent with the stabilized rotation to obtain a wet silica; and heating this wet silica.

A blending amount of the treated silica of the component (B) is 5 to 100 parts by mass, and preferably 10 to 60 parts by mass, relative to 100 parts by mass of the organopolysiloxane of the component (A). A too low blending amount of the component (B) cannot yield the reinforcing effect, and a too high blending amount thereof deteriorates processability and decreases mechanical strength.

The alkenyl group-containing organosilane for treating the silica is the vinyl group-containing alkoxysilane and/or the vinyl group-containing organosilazane. The vinyl group-containing alkoxysilane is not particularly limited, and vinyltriethoxysilane, vinyltrimethoxysilane, divinyldimethoxysilane, and vinyltris(methoxyethoxy)silane are preferable.

The vinyl group-containing organosilazane is not particularly limited. Examples thereof include 1-vinylpentamethyldisilazane, 1,3-divinyl-1,1,3,3-tetramethyldisilazane, and 1,3-dimethyl-1,1,3,3-tetravinyldisilazane, and 1,3-divinyl-1, 1,3,3-tetramethyldisilazane, and 1,3-divinyl-1,1,3,3-tetramethyldisilazane is preferable.

In the present invention, since the silica is previously treated with such an alkenyl group-containing organosilane, the silicone rubber cured product having no effect of the low molecular siloxane derived from the surface treatment agent, having a small change in the plasticity degree of the silicone rubber compound, and having a small compression set can be obtained.

Component (C)

The curing agent is not particularly limited as long as it can cure the silicone rubber compound, and examples thereof include the following addition-reaction curing agent (C-1) and organic peroxide curing agent (C-2).

(C-1) Addition-Reaction Curing Agent

For the addition-reaction curing agent (C-1), an organohydrogenpolysiloxane and a hydrosilylation catalyst are used in combination.

The organohydrogenpolysiloxane may have any of linear, cyclic, branched, and three-dimensional network structures as long as it has two or more, preferably three or more, more preferably 3 to 200, further preferably approximately 4 to 100, hydrogen atoms bonded to silicon atoms (that is, hydrosilyl groups) in one molecule. An organohydrogenpolysiloxane known as a crosslinker for an addition-reaction curable silicone rubber composition can be used, and for example, an organohydrogenpolysiloxane represented by the following average composition formula (2) can be used.

$$R^2_r H_s SiO_{(4-r-s)/2} \tag{2}$$

In the average composition formula (2), $R^2$ is identical to or different from each other, and represents an unsubstituted or substituted monovalent hydrocarbon group. The monovalent hydrocarbon group preferably excludes an aliphatic unsaturated bond. The monovalent hydrocarbon group typically preferably has 1 to 12 carbon atoms, particularly preferably 1 to 8 carbon atoms. Specific examples thereof include: alkyl groups, such as a methyl group, an ethyl group, and a propyl group; cycloalkyl groups, such as a cyclohexyl group; aryl groups, such as a phenyl group and a tolyl group; aralkyl groups, such as a benzyl group, a 2-phenylethyl group, and a 2-phenylpropyl group; and groups in which a part or all of hydrogen atoms in these groups are substituted with a halogen atom, etc., for example, a 3,3,3-trifluoropropyl group.

"r" and "s" represent a positive number satisfying $0<r<3$, preferably $0.5 \leq r \leq 2.2$, more preferably $1.0 \leq r \leq 2.0$, $0<s \leq 3$, preferably $0.002 \leq s \leq 1.1$, more preferably $0.005 \leq s \leq 1$, $0<r+s \leq 3$, preferably $1 \leq r+s \leq 3$, and more preferably $1.002 \leq r+s \leq 2.7$.

The organohydrogenpolysiloxane has two or more, preferably three or more, hydrosilyl groups in one molecule. These hydrosilyl groups may be present at the terminal of the molecular chain, may be present in the molecular chain, or may be present at both of them. This organohydrogenpolysiloxane preferably has a viscosity at 25° C. of 0.5 to 10.000 mPa·s, particularly 1 to 300 mPa·s. The viscosity is a value measured with a rotational viscosimeter at 25° C. (the same applies hereinafter).

Specific examples of such an organohydrogenpolysiloxane include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, a methylhydrogensiloxane-dimethylsiloxane cyclic copolymer, methylhydrogenpolysiloxane blocked at both terminals with trimethylsiloxy groups, a dimethylsiloxane-methylhydrogensiloxane copolymer blocked at both terminals with trimethylsiloxy groups, dimethylpolysiloxane blocked at both terminals with dimethylhydrogensiloxy groups, a dimethylsiloxane-methylhydrogensiloxane copolymer blocked at both terminals with dimethylhydrogensiloxy groups, a methylhydrogensiloxane-diphenylsiloxane copolymer blocked at both terminals with trimethylsiloxy groups, a methylhydrogensiloxane-diphenylsiloxane-dimethylsiloxane copolymer blocked at both terminals with trimethylsiloxy groups, a methylhydrogensiloxane-methylphenylsiloxane-dimethylsiloxane copolymer blocked at both terminals with trimethylsiloxy groups, a methylhydrogensiloxane-dimethylsiloxane-diphenylsiloxane copolymer blocked at both terminals with dimethylhydrogensiloxy groups, a methylhydrogensiloxane-dimethylsiloxane-methylphenylsiloxane copolymer blocked at both terminals with dimethylhydrogensiloxy groups, a copolymer composed of a $(CH_3)_2HSiO_{1/2}$ unit, a $(CH_3)_3SiO_{1/2}$ unit, and a $SiO_{4/2}$ unit, a copolymer composed of a $(CH_3)_2HSiO_{1/2}$ unit and a $SiO_{4/2}$ unit, a copolymer composed of a $(CH_3)_2HSiO_{1/2}$ unit, a $SiO_{4/2}$ unit, and a $(C_6H_5)_3SiO_{1/2}$ unit, and a polysiloxane in which a part or all of methyl groups in the above exemplified compounds are substituted with other alkyl groups, phenyl groups, etc.

A blending amount of the organohydrogenpolysiloxane is preferably 0.1 to 40 parts by mass relative to 100 parts by mass of the component (A). A proportion of hydrogen atoms bonded to silicon atoms (hydrosilyl groups) per aliphatic unsaturated bond (alkenyl group, diene group, etc.) in the component (A) and the component (B) is appropriately within a range of 0.5 to 10, and preferably approximately within a range of 0.7 to 5. The proportion of 0.5 or more yields sufficient crosslinking and sufficient mechanical strength. The proportion of 10 or less does not deteriorate physical characteristics after the curing, and particular, not deteriorate the heat resistance and not increase the compression set.

The hydrosilylation catalyst is a catalyst that proceeds a hydrosilylation addition reaction between: the alkenyl group in the component (A) and the alkenyl group (vinyl group) in the component (B); and the silicon atom-bonded hydrogen atom (hydrosilyl group) in the organohydrogenpolysiloxane. Examples of the hydrosilylation catalyst include a platinum-group metallic catalyst, and include a simple platinum-group metal and a compound thereof. For the catalyst, conventionally known catalysts for an addition-reaction curable silicone rubber composition can be used. Examples thereof include: particulate platinum metals adsorbed on a support such as silica, alumina, or silica gel; platinum catalysts such as an alcohol solution of platinum (IV) chloride, chloroplatinic acid, or a chloroplatinate hexahydrate salt; palladium catalysts; and rhodium catalysts. Platinum or a platinum compound (platinum catalyst) is preferable.

An addition amount of the catalyst may be any as long as it can promote the addition reaction, and the catalyst is typically used within a range of 1 mass-ppm to 1 mass % relative to the silicone rubber compound in terms of the platinum-group metal amount, and preferably within a range of 10 to 500 mass-ppm. The addition amount of 1 mass-ppm or more sufficiently proceeds the addition reaction, resulting in sufficient curing. Meanwhile, the addition amount of 1 mass % or less yields sufficient reactivity, and is not uneconomical.

To regulate the curing rate, an addition-reaction inhibitor may be used in addition to the above catalyst according to the object of the present invention. Specific examples thereof include an acetylenealcohol-based inhibitor such as ethynylcyclohexanol, and tetracyclomethylvinylpolysiloxane. The addition-reaction inhibitor may be used singly, or may be used in combination of two or more kinds thereof.

(C-2) Organic Peroxide Curing Agent

Examples of the organic peroxide curing agent (C-2) include benzoyl peroxide, 2,4-dichlorobenzoyl peroxide, p-methylbenzoyl peroxide, o-methylbenzoyl peroxide, 2,4-dicumyl peroxide, 2,5-dimethyl-2,5-bis(t-butylperoxy)hexane, di-t-butyl peroxide, t-butyl perbenzoate, and 1,6-hexanediol-bis-t-butyl peroxycarbonate.

An addition amount of the organic peroxide curing agent is preferably 0.1 to 10 parts by mass, and particularly preferably 0.2 to 5 parts by mass, relative to 100 parts by mass of the component (A). The blending amount of 0.1 part by mass or more prevents insufficient curing. The blending amount of 10 parts by mass or less prevents yellowing of the silicone rubber cured product due to a decomposition residue of the organic peroxide curing agent. The component (C-1) and the component (C-2) may be blended in combination with the component (A) at blending amounts within each of the above range to form a co-vulcanized silicone rubber composition.

The component (C-1) and the component (C-2) can be used for different purposes. For example, since the addition-reaction curing agent used for an electric wire, etc. may cause problems of adhering to a core wire, the organic peroxide curing agent is preferably used. Meanwhile, since there is concern about an effect of the decomposition residue of the organic peroxide curing agent for food-contact use, such as food trays, the addition-reaction curing agent is preferably used.

Other Components

Into the inventive silicone rubber composition, fillers and additives known for a thermally curable silicone rubber composition are optionally added in addition to the above components, as necessary. Examples thereof include fillers such as crushed quartz, crystalline silica, diatomaceous earth, and calcium carbonate, a colorant, a tear strength enhancer, an acid acceptor, a thermal conductivity enhancer such as alumina or boron nitride, a mold releasing agent, each alkoxysilane as a dispersant for a filler, particularly a phenyl group-containing alkoxysilane and a hydrolyzed product thereof, diphenylsilanediol, and a carbon-functional silane.

<Curing Condition>

The inventive millable-type silicone rubber composition can be cured by a known curing method under a known curing condition. Specifically, the composition can be cured by heating at typically 25 to 200° C., preferably 80 to 160° C. The heating time is approximately 0.5 minutes to 5 hours, particularly approximately 1 minute to 3 hours.

The inventive millable-type silicone rubber composition described above can be a millable-type silicone rubber composition with: a low amount of the low molecular siloxane component; and small plasticity setback by using the organopolysiloxane of the component (A) and the treated silica of the component (B) in combination.

Silicone Rubber Cured Product

The inventive silicone rubber cured product comprises a cured product of the inventive millable-type silicone rubber composition.

Thus, the inventive silicone rubber cured product is a cured product with low content of the low molecular siloxane and good compression set.

For example, in the inventive silicone rubber cured product, a total content of the low molecular siloxane component having a polymerization degree of 10 or less can be less than 1,000 ppm. A lower content of the low molecular siloxane having a polymerization degree of 10 or less is more preferable. A lower limit thereof is not particularly limited, and can be 10 ppm or more, for example.

EXAMPLES

Hereinafter, the present invention will be specifically described by using Examples and Comparative Examples, but the present invention is not limited thereto.

Preparation Examples 1 to 4 and Comparative Preparation Examples 1 to 3

Hydrophobicity degrees in the following Preparation Examples and Comparative Preparation Examples were measured by the following method.

<Method for Measuring Hydrophobicity Degree (Methanol Titration)>

Into a 200-mL beaker, 50 mL of pure water is poured, 0.2 g of a sample is added, and the mixture is stirred with a magnetic stirrer. A tip of a burette charged with methanol is sank into the liquid, methanol is added dropwise with stirring, and the hydrophobicity degree is obtained by the following formula where an addition amount of methanol required for completely dispersing the sample in the water is Y mL. Table 1 shows hydrophobicity degrees of the following treated silicas 1 to 7.

$$\text{Hydrophobicity Degree}=\{Y/(50+Y)\}\times100$$

Preparation Example 1

Into a high-speed mixer (capacity: 10 L), 200 g of a fumed silica (AEROSIL 200, manufactured by NIPPON AEROSIL CO., LTD.) was added, and the mixer was operated at a number of rotations of 1,500 rpm. When the rotation was stabilized, 20 g of dimethylpolysiloxane and 1.2 g of vinyltrimethoxysilane were sprayed for 20 seconds as a hydrophobing agent to obtain a wet silica. The dimethylpolysiloxane had silanol groups at both terminals, an average polymerization degree of 4, and a viscosity at 25° C. of 15 mPa·s. Into a 2-L flask, 100 g of this wet silica was added and heated at 250° C. for 2.5 hours. The obtained treated silica 1 had a hydrophobicity degree in accordance with the methanol titration of 62.

Preparation Example 2

A treated silica 2 was prepared in the same manner as in Preparation Example 1 except that the amount of vinyltrimethoxysilane was 0.6 g. The obtained treated silica 2 had a hydrophobicity degree in accordance with the methanol titration of 61.

Preparation Example 3

A treated silica 3 was prepared in the same manner as in Preparation Example 1 except that the amount of the dimethylpolysiloxane having silanol groups at both terminals, an average polymerization degree of 4, and a viscosity at 25° C. of 15 mPa·s was 30 g. The obtained treated silica 3 had a hydrophobicity degree in accordance with the methanol titration of 66.

Preparation Example 4

A treated silica 4 was prepared in the same manner as in Preparation Example 1 except that 0.6 g of 1,3-divinyl-1,1,3,3-tetramethyldisilazane was used instead of vinyltrimethoxysilane. The obtained treated silica 4 had a hydrophobicity degree in accordance with the methanol titration of 68.

Comparative Preparation Example 1

A treated silica 5 was prepared in the same manner as in Preparation Example 1 except that the amount of the dimethylpolysiloxane having silanol groups at both terminals, an average polymerization degree of 4, and a viscosity at 25° C. of 15 mPa·s was 10 g. The obtained treated silica 5 had a hydrophobicity degree in accordance with the methanol titration of 35.

Comparative Preparation Example 2

A treated silica 6 was prepared in the same manner as in Preparation Example 1 except that vinyltrimethoxysilane was not added. The obtained treated silica 6 had a hydrophobicity degree in accordance with the methanol titration of 60.

Comparative Preparation Example 3

A treated silica 7 was prepared in the same manner as in Preparation Example 3 except that vinyltrimethoxysilane was not added. The obtained treated silica 7 had a hydrophobicity degree in accordance with the methanol titration of 65.

Synthesis Example and Comparative Synthesis Example

Organopolysiloxanes (1) and (2) to be base polymers were synthesized as follows.

Synthesis Example

Into a mixture of 1,800 g of octamethylcyclotetrasiloxane, 0.5 g of 1,3-divinyl-1,1,3,3-tetramethyldisiloxane, and 2.6 g of 1,3,5,7-tetramethyl-1,3,5,7-tetravinylcyclosiloxane, 3 g of 10% dimethylpolysiloxanate of tetra-n-butylphosphonium hydroxide was added, and subjected to a polymerization reaction at 110° C. for 1 hour.

After the polymerization reaction, the temperature was held at 150° C. for 2 hours to pyrolyze the tetra-n-butylphosphonium hydroxide, and then 1.3 g of N,O-bis(trimethylsilyl)acetamide was added. The temperature was held for 1 hour, and then the volatile component was distilled off with holding the temperature within 170 to 180° C. under a reduced pressure until 2 mmHg or lower for approximately 8 hours to obtain an organopolysiloxane (1) having vinyl groups at both terminals and in side chains. The obtained organopolysiloxane (1) had a weight-average polymerization degree of 8,000. Contents of low molecular cyclic siloxanes having a polymerization degree of 3 to 10 (low molecular siloxanes D3 to D10) contained in this organopolysiloxane (1) were measured under the following measurement condition. Table 2 shows the measurement results.

Comparative Synthesis Example

An organopolysiloxane (2) having vinyl groups at both terminals and in side chains was obtained by the same preparation as in Synthesis Example except that, instead of distilling off the volatile component with holding the temperature within 170 to 180° C. under a reduced pressure until 2 mmHg or lower for approximately 8 hours, the volatile component was distilled off with holding the temperature within 150 to 160° C. under a reduced pressure until 2 mmHg or lower for approximately 2 hours. The obtained organopolysiloxane (2) had a weight-average polymerization degree of 8,000. Table 2 shows contents of low molecular cyclic siloxanes having a polymerization degree of 3 to 10 (low molecular siloxanes D3 to D10) contained in this organopolysiloxane (2).

The contents of the impurity (the low molecular siloxane having a polymerization degree of 10 or less) contained in the organopolysiloxanes (1) and (2) were determined under the following condition. Note that, a low molecular siloxane having a polymerization degree of 2 or less was not detected.

Measurement Condition

Apparatus: Gas chromatograph Nexis GC-2030, manufactured by SHIMADZU CORPORATION Carrier gas: Helium Flow rate: 0.6 mL/min Detector: Flame ionization detector (FID)

Detector temperature: 320° C.

Column: DB-5MS (inner diameter: 0.53 mm$\phi$×length: 30 m, filler: silica)

(manufactured by Agilent Technologies Japan, Ltd.)

Column Temperature: 50 to 280° C. (heating rate: 10° C./min)

Injection amount of sample: 1.0 μL

Internal standard: n-Tetradecane

Examples 1 to 7 and Comparative Examples 1 to 7

Base compounds (1) to (13), silicone rubber compositions (1) to (14), and test sheets (1) to (14) were prepared as follows. Each physical property of the silicone rubber compounds (base compounds) and the silicone rubber cured products (test sheets) was measured as follows.

<Measurement of Plasticity Degree>

The obtained silicone rubber compound was kneaded 15 times with three rollers, and 10 minutes thereafter, Williams plasticity degree (initial) was measured. Then, a plasticity degree after 1 day at 40° C. was measured. In addition, calculated was a rate of change with time of the plasticity degree after 1 day at 40° C. relative to the initial thereof. The Williams plasticity degree was measured in accordance with JIS K 6249:2003.

<Measurement of Physical Properties of Rubber>

In accordance with JIS K 6249:2003, each of physical properties (hardness (durometer A), tensile strength, and elongation at break) of the obtained silicone rubber cured product was measured.

<Measurement of Compression Set>

Using a specimen for measuring a compression set produced in accordance with JIS K 6249:2003, a compression set was measured by a method in accordance with JIS K 6249:2003.

Example 1

Addition of 100 parts by mass of the organopolysiloxane (1) synthesized in the Synthesis Example and 35 parts by mass of the treated silica 1 prepared in Preparation Example 1 was performed, and then the mixture was mixed with a kneader to prepare a base compound (1) (Table 3).

Into 100 parts by mass of this base compound (1), 0.9 parts by mass of methylhydrogenpolysiloxane having hydrosilyl groups in side chains (polymerization degree: 38, hydrosilyl group: 0.00725 mol/g) as a curing agent, 0.04 parts by mass of ethynylcyclohexanol as a reaction inhibitor, and 0.05 parts by mass of a platinum catalyst (Pt concentration: 1 mass %) were added with a twin roller, and the mixture was uniformly mixed to manufacture a raw-rubber silicone rubber composition (1). This composition was then press-cured under a condition at 120° C. and 70 kgf/cm$^2$ for 10 minutes to produce a test sheet (1) with 2 mm in thickness. A hardness, tensile strength, and elongation at break thereof were measured by the above methods. This composition was press-cured under a condition at 120° C. and 70 kgf/cm$^2$ for 15 minutes to produce a cured product, and a compression set thereof was measured. Table 4 shows the measurement results.

Example 2

A base compound (2) was prepared in the same manner as in Example 1 except that the amount of the treated silica 1 was 60 parts by mass (Table 3). Then, a silicone rubber composition (2) was prepared in the same manner as in Example 1. A test sheet (2) was produced by using the obtained composition in the same manner as in Example 1, and a hardness, tensile strength, elongation at break, and compression set thereof were measured by methods same as above. Table 4 shows the measurement results.

Example 3

A base compound (3) was prepared in the same manner as in Example 1 except that the treated silica 2 prepared in Preparation Example 2 was used instead of the treated silica 1 (Table 3). Then, a silicone rubber composition (3) was prepared in the same manner as in Example 1. A test sheet (3) was produced by using the obtained composition in the same manner as in Example 1, and a hardness, tensile strength, elongation at break, and compression set thereof were measured by methods same as above. Table 4 shows the measurement results.

Example 4

A base compound (4) was prepared in the same manner as in Example 1 except that the treated silica 3 prepared in Preparation Example 3 was used instead of the treated silica 1 (Table 3). Then, a silicone rubber composition (4) was prepared in the same manner as in Example 1. A test sheet (4) was produced by using the obtained composition in the same manner as in Example 1, and a hardness, tensile strength, elongation at break, and compression set thereof were measured by methods same as above. Table 4 shows the measurement results.

Example 5

A base compound (5) was prepared in the same manner as in Example 1 except that, during the preparation of the base compound, the mixture was heat-treated with a kneader at 170° C. for 2 hours (Table 3). Then, a silicone rubber composition (5) was prepared in the same manner as in Example 1. A test sheet (5) was produced by using the obtained composition in the same manner as in Example 1, and a hardness, tensile strength, elongation at break, and compression set thereof were measured by methods same as above. Table 4 shows the measurement results.

Example 6

A base compound (6) was prepared in the same manner as in Example 1 except that the treated silica 4 prepared in Preparation Example 4 was used instead of the treated silica 1 (Table 3). Then, a silicone rubber composition (6) was prepared in the same manner as in Example 1. A test sheet (6) was produced by using the obtained composition in the same manner as in Example 1, and a hardness, tensile strength, elongation at break, and compression set thereof were measured by methods same as above. Table 4 shows the measurement results.

Example 7

Into 100 parts by mass of the base compound (1), 0.6 parts by mass of 2,5-dimethyl-2,5-bis(t-butylperoxy)hexane as a curing agent was added with a twin roller, and the mixture was uniformly mixed to manufacture a raw-rubber silicone rubber composition (7) This composition was then press-cured under a condition at 165° C. and 70 kgf/cm$^2$ for 10 minutes to produce a test sheet (7) with 2 mm in thickness. A hardness, tensile strength, and elongation at break thereof were measured by methods same as above. This composition was press-cured under a condition at 165° C. and 70 kgf/cm$^2$ for 15 minutes to produce a cured product, and a compression set thereof was measured by a method same as above. Table 4 shows the measurement results.

Comparative Example 1

A base compound (7) was prepared in the same manner as in Example 1 except that the treated silica 5 prepared in Comparative Preparation Example 1 was used instead of the treated silica 1 (Table 3). Then, a silicone rubber composition (8) was prepared in the same manner as in Example 1. A test sheet (8) was produced by using the obtained composition in the same manner as in Example 1, and a hardness, tensile strength, elongation at break, and compression set thereof were measured by methods same as above. Table 4 shows the measurement results.

Comparative Example 2

A base compound (8) was prepared in the same manner as in Example 1 except that the treated silica 6 prepared in Comparative Preparation Example 2 was used instead of the treated silica 1 (Table 3). Then, a silicone rubber composition (9) was prepared in the same manner as in Example 1. A test sheet (9) was produced by using the obtained composition in the same manner as in Example 1, and a hardness, tensile strength, elongation at break, and compression set thereof were measured by methods same as above. Table 4 shows the measurement results.

Comparative Example 3

A base compound (9) was prepared in the same manner as in Example 2 except that the treated silica 6 prepared in Comparative Preparation Example 2 was used instead of the treated silica 1 (Table 3). Then, a silicone rubber composition (10) was prepared in the same manner as in Example 1. A test sheet (10) was produced by using the obtained composition in the same manner as in Example 1, and a hardness, tensile strength, elongation at break, and compression set thereof were measured by methods same as above. Table 4 shows the measurement results.

Comparative Example 4

A base compound (10) was prepared in the same manner as in Example 1 except that the treated silica 7 prepared in Comparative Preparation Example 3 was used instead of the treated silica 1 (Table 3). Then, a silicone rubber composition (11) was prepared in the same manner as in Example 1. A test sheet (11) was produced by using the obtained composition in the same manner as in Example 1, and a hardness, tensile strength, elongation at break, and compression set thereof were measured by methods same as above. Table 4 shows the measurement results.

Comparative Example 5

A base compound (11) was prepared in the same manner as in Example 1 except that the treated silica 6 prepared in Comparative Preparation Example 2 was used instead of the treated silica 1 (Table 3). Then, a silicone rubber composition (12) was prepared in the same manner as in Example 7. A test sheet (12) was produced by using the obtained composition in the same manner as in Example 1, and a hardness, tensile strength, elongation at break, and compression set thereof were measured by methods same as above. Table 4 shows the measurement results.

Comparative Example 6

A base compound (12) was prepared in the same manner as in Example 1 except that the organopolysiloxane (2) synthesized in Comparative Synthesis Example was used instead of the organopolysiloxane (1) (Table 3). Then, a silicone rubber composition (13) was prepared in the same manner as in Example 1. A test sheet (13) was produced by using the obtained composition in the same manner as in Example 1, and a hardness, tensile strength, elongation at break, and compression set thereof were measured by methods same as above. Table 4 shows the measurement results.

Comparative Example 7

A base compound (13) was prepared in the same manner as in Example 5 (Table 3) except that used instead of the treated silica 1 were: 32 parts by mass of a fumed silica (AEROSIL 200, manufactured by NIPPON AEROSIL CO., LTD.); 4 parts by mass of dimethylpolysiloxane having silanol groups at both terminals, an average polymerization degree of 4, and a viscosity at 25° C. of 15 mPa·s; and 0.2 parts by mass of vinyltrimethoxysilane. Then, a silicone rubber composition (14) was prepared in the same manner as in Example 1. A test sheet (14) was produced by using the obtained composition in the same manner as in Example 1, and a hardness, tensile strength, elongation at break, and compression set thereof were measured by methods same as above. Table 4 shows the measurement results.

Hereinafter, measured were: contents of low molecular cyclic siloxanes (D3 to D10) having a polymerization degree of 3 to 10 contained in each of the base compounds (1) to (13) used in Examples and Comparative Examples; and a content of the low molecular siloxane in each of the test sheets (1) to (14) in a procedure described above. Table 5 shows the results. Note that, a low molecular siloxane having a polymerization degree of 2 or less was not detected.

TABLE 1

|  | Preparation Example | | | | Comparative Preparation Example | | |
|---|---|---|---|---|---|---|---|
|  | Treated silica 1 | Treated silica 2 | Treated silica 3 | Treated silica 4 | Treated silica 5 | Treated silica 6 | Treated silica 7 |
| AEROSIL 200 | 200 | 200 | 200 | 200 | 200 | 200 | 200 |
| Dimethylpolysiloxane having silanol groups at both terminals | 20 | 20 | 30 | 20 | 10 | 20 | 30 |
| Vinyltrimethoxysilane | 1.2 | 0.6 | 1.2 | | 1.2 | | |
| 1,3-Divinyl-1,1,3,3-tetramethyldisilazane | | | | 0.6 | | | |
| Hydrophobicity degree | 62 | 61 | 66 | 68 | 35 | 60 | 65 |

TABLE 2 / TABLE 2-continued

|  | Synthesis Example Organopolysiloxane (1) | Comparative Synthesis Example Organopolysiloxane (2) |  |  | Synthesis Example Organopolysiloxane (1) | Comparative Synthesis Example Organopolysiloxane (2) |
|---|---|---|---|---|---|---|
| D3 | <10 | 1,250 |  | D9 | 110 | 750 |
| D4 | <10 | 6,990 |  | D10 | 150 | 620 |
| D5 | <10 | 6,970 |  | | | |
| D6 | 30 | 6,790 |  | ΣD3-D10 | 450 | 11,440 |
| D7 | 80 | 2,280 |  | | | |
| D8 | 80 | 1,000 |  | | | |

Unit: ppm

TABLE 3

|  |  | Base compound (1) | Base compound (2) | Base compound (3) | Base compound (4) | Base compound (5) | Base compound (6) |
|---|---|---|---|---|---|---|---|
| (A) | Organopolysiloxane (1) | 100 | 100 | 100 | 100 | 100 | 100 |
| (B) | Treated silica 1 | 35 | 60 | | | 35 | |
| | Treated silica 2 | | | 35 | | | |
| | Treated silica 3 | | | | 35 | | |
| | Treated silica 4 | | | | | | 35 |

|  |  | Base compound (7) | Base compound (8) | Base compound (9) | Base compound (10) | Base compound (11) | Base compound (12) | Base compound (13) |
|---|---|---|---|---|---|---|---|---|
| (A) | Organopolysiloxane (1) | 100 | 100 | 100 | 100 | 100 | | 100 |
| | Organopolysiloxane (2) | | | | | | 100 | |
| (B) | Treated silica 1 | | | | | | 35 | |
| | Treated silica 5 | 35 | | | | | | |
| | Treated silica 6 | | 35 | 60 | | 35 | | |
| | Treated silica 7 | | | | 35 | | | |
| | AEROSIL 200 | | | | | | | 32 |
| | Dimethylpolysiloxane having silanol groups at both terminals | | | | | | | 4 |
| | Vinyltrimethoxysilane | | | | | | | 0.2 |

TABLE 4

|  | Ex. 1 | Ex. 2 | Ex. 3 | Ex. 4 | Ex. 5 | Ex. 6 | Ex. 7 |
|---|---|---|---|---|---|---|---|
| Base compound (1) | 100 | | | | | | 100 |
| Base compound (2) | | 100 | | | | | |
| Base compound (3) | | | 100 | | | | |
| Base compound (4) | | | | 100 | | | |
| Base compound (5) | | | | | 100 | | |
| Base compound (6) | | | | | | 100 | |

TABLE 4-continued

| | | | | | | | | | |
|---|---|---|---|---|---|---|---|---|---|
| (C-1) | Methylhydrogen-polysiloxane | | 0.9 | 0.9 | 0.9 | 0.9 | 0.9 | 0.9 | |
| | Platinum catalyst | | 0.05 | 0.05 | 0.05 | 0.05 | 0.05 | 0.05 | |
| | Ethynylcyclohexanol | | 0.04 | 0.04 | 0.04 | 0.04 | 0.04 | 0.04 | |
| (C-2) | 2,5-Dimethyl-2,5-bis (t-butylperoxy) hexane | | | | | | | | 0.6 |
| Evaluation results | Plasticity | Initial | 174 | 350 | 156 | 152 | 170 | 172 | 174 |
| | | After 1 day at 40° C. | 186 | 398 | 164 | 158 | 183 | 182 | 186 |
| | | (After 1 day at 40° C.-Initial) *100 | 6.9 | 13.7 | 5.1 | 3.9 | 7.6 | 5.8 | 6.9 |
| | Hardness (durometer A) | | 49 | 63 | 46 | 46 | 48 | 48 | 50 |
| | Tensile strength (MPa) | | 10.0 | 10.5 | 9.8 | 9.9 | 10.1 | 10.2 | 10.5 |
| | Elongation at break (%) | | 590 | 520 | 620 | 610 | 590 | 600 | 580 |
| | Compression set (150° C./22 h) | | 16 | 20 | 14 | 13 | 15 | 15 | 8 |

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| | Base compound (7) | | 100 | | | | | | |
| | Base compound (8) | | | 100 | | | | | |
| | Base compound (9) | | | | 100 | | | | |
| | Base compound (10) | | | | | 100 | | | |
| | Base compound (11) | | | | | | 100 | | |
| | Base compound (12) | | | | | | | 100 | |
| | Base compound (13) | | | | | | | | 100 |
| (C-1) | Methyl hydrogen-polysiloxane | | 0.9 | 0.9 | 0.9 | 0.9 | | 0.9 | 0.9 |
| | Platinum catalyst | | 0.05 | 0.05 | 0.05 | 0.05 | | 0.05 | 0.05 |
| | Ethynyl-cyclohexanol | | 0.04 | 0.04 | 0.04 | 0.04 | | 0.04 | 0.04 |
| (C-2) | 2,5-Dimethyl-2,5-bis (t-butyl-peroxy) hexane | | | | | | 0.6 | | |
| Evaluation results | Plasticity | Initial | 356 | 185 | 358 | 158 | 185 | 170 | 172 |
| | | After 1 day at 40° C. | 488 | 197 | 410 | 166 | 197 | 182 | 183 |
| | | (After 1 day at 40° C.-Initial) *100 | 37.1 | 6.5 | 14.5 | 5.1 | 6.5 | 7.1 | 6.4 |
| | Hardness (durometer A) | | 54 | 53 | 62 | 52 | 52 | 48 | 50 |
| | Tensile strength (MPa) | | 8.2 | 10.5 | 9.8 | 10.1 | 10.4 | 10.1 | 10.3 |
| | Elongation at break (%) | | 480 | 510 | 540 | 600 | 560 | 600 | 590 |
| | Compression set (150° C./22 h) | | 51 | 33 | 42 | 31 | 28 | 17 | 18 |

21

TABLE 5

| Base compound | Ex. 1 (1) | Ex. 2 (2) | Ex. 3 (3) | Ex. 4 (4) | Ex. 5 (5) | Ex. 6 (6) | Ex. 7 (1) |
|---|---|---|---|---|---|---|---|
| D3 | <10 | <10 | <10 | <10 | <10 | <10 | <10 |
| D4 | <10 | <10 | <10 | <10 | <10 | <10 | <10 |
| D5 | <10 | <10 | <10 | <10 | <10 | <10 | <10 |
| D6 | 20 | 20 | 20 | 20 | <10 | 10 | 20 |
| D7 | 60 | 50 | 70 | 70 | 20 | 50 | 60 |
| D8 | 60 | 40 | 90 | 90 | 30 | 70 | 60 |
| D9 | 80 | 70 | 100 | 100 | 50 | 80 | 80 |
| D10 | 110 | 90 | 100 | 100 | 80 | 100 | 110 |
| ΣD3-D10 | 330 | 270 | 380 | 380 | 180 | 310 | 330 |
| Test sheet | (1) | (2) | (3) | (4 ) | (5) | (6) | (7) |
| D3 | <10 | <10 | <10 | <10 | <10 | <10 | <10 |
| D4 | <10 | <10 | <10 | <10 | <10 | <10 | <10 |
| D5 | <10 | <10 | <10 | <10 | <10 | <10 | <10 |
| D6 | <10 | <10 | <10 | <10 | <10 | <10 | <10 |
| D7 | <10 | <10 | <10 | <10 | <10 | <10 | <10 |
| D8 | <10 | <10 | <10 | <10 | <10 | <10 | <10 |
| D9 | 10 | <10 | 10 | <10 | <10 | <10 | <10 |
| D10 | 20 | 10 | 20 | 10 | 20 | 10 | 20 |
| ΣD3-D10 | 30 | 10 | 30 | 10 | 20 | 10 | 20 |

| Base compound | Comp. Ex. 1 (7) | Comp. Ex. 2 (8) | Comp. Ex. 3 (9) | Comp. Ex. 4 (10) | Comp . Ex. 5 (11) | Comp. Ex. 6 (12) | Comp. Ex. 7 (13) |
|---|---|---|---|---|---|---|---|
| D3 | <10 | <10 | <10 | <10 | <10 | 930 | 2300 |
| D4 | <10 | <10 | <10 | <10 | <10 | 5000 | 4870 |
| D5 | <10 | <10 | <10 | <10 | <10 | 5200 | 3220 |
| D6 | 20 | 20 | 10 | 20 | 20 | 5030 | 830 |
| D7 | 70 | 70 | 40 | 80 | 80 | 1700 | 80 |
| D8 | 60 | 70 | 50 | 90 | 70 | 720 | 90 |
| D9 | 90 | 80 | 80 | 100 | 90 | 560 | 80 |
| D10 | 100 | 90 | 90 | 110 | 100 | 470 | 110 |
| ΣD3-D10 | 340 | 330 | 270 | 400 | 340 | 19610 | 11580 |
| Test sheet | (8) | (9) | (10) | (11) | (12) | (13) | (14) |
| D3 | <10 | <10 | <10 | <10 | <10 | 850 | 1230 |
| D4 | <10 | <10 | <10 | <10 | <10 | 4500 | 4270 |
| D5 | <10 | <10 | <10 | <10 | <10 | 4450 | 2980 |
| D6 | <10 | <10 | <10 | <10 | <10 | 4390 | 790 |
| D7 | <10 | <10 | <10 | <10 | <10 | 1580 | 70 |
| D8 | <10 | <10 | <10 | <10 | <10 | 620 | 70 |
| D9 | 10 | <10 | 10 | <10 | <10 | 490 | 70 |
| D10 | 20 | 10 | 20 | 10 | 20 | 450 | 90 |
| ΣD3-D10 | 30 | 10 | 30 | 10 | 20 | 17330 | 9570 |

The results shown in Table 4 demonstrate the followings. The inventive millable-type silicone rubber compositions of Examples 1 and 3 to 6, which blend the addition-reaction curing agent, are found to exhibit a smaller rate of change in the plasticity degree and a smaller compression set than the millable-type silicone rubber composition of Comparative Example 1, which blends the treated silica having a hydrophobicity degree of less than 40. The millable-type silicone rubber composition of Example 2, which blends the addition-reaction curing agent, is found to exhibit a smaller compression set than the millable-type silicone rubber composition of Comparative Example 3, which blends the treated silica using no vinyl group-containing alkoxysilane nor vinyl group-containing organosilazane as a treating agent.

In addition, the millable-type silicone rubber composition of Example 7, which uses the organic peroxide curing agent, is found to exhibit a smaller compression set than the millable-type silicone rubber composition of Comparative Example 5, which blends the treated silica using no vinyl group-containing alkoxysilane nor vinyl group-containing organosilazane as a treating agent for the treated silica. The results shown in Table 5 demonstrate that each of the inventive millable-type silicone rubber compositions of Examples 1 to 7 can yield a cured product with a low content of the low molecular siloxane component.

Meanwhile, from the results shown in Table 4, the millable-type silicone rubber composition of Comparative Example 1 exhibited a larger rate of change in the plasticity degree than those of Examples since blending the treated silica having a hydrophobicity degree of less than 40. The millable-type silicone rubber compositions of Comparative Examples 2 to 5 exhibited a large compression set since using no vinyl group-containing alkoxysilane nor vinyl group-containing organosilazane as a treating agent for the treated silica.

The results shown in Table 4 demonstrate that the millable-type silicone rubber compositions of Comparative Examples 6 and 7 exhibit a small rate of change in the plasticity and a good compression set. However, the results shown in Table 5 demonstrate to have a high content of the low molecular siloxane component.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A millable-type silicone rubber composition, comprising:
   (A) 100 parts by mass of an organopolysiloxane represented by the following average composition formula (1), the organopolysiloxane having at least two alkenyl groups in one molecule and having a polymerization degree of 100 or more, wherein a content of a low molecular siloxane contained as an impurity and having a polymerization degree of 10 or less is less than 1,000 ppm;

$$R^1_a SiO_{(4-a)/2} \qquad (1),$$

wherein $R^1$ is identical to or different from each other, and represents an unsubstituted or substituted monovalent hydrocarbon group, and "a" represents a positive number of 1.95 to 2.05,
   (B) 5 to 100 parts by mass of a treated silica treated with any one or both of a vinyl group-containing alkoxysilane and a vinyl group-containing organosilazane, the treated silica having a hydrophobicity degree of 40% or more; and
   (C) an effective amount of a curing agent.

2. The millable-type silicone rubber composition according to claim 1, wherein the component (B) is the treated silica treated with any one or both of the vinyl group-containing alkoxysilane and the vinyl group-containing organosilazane, a content of the vinyl group being 0.0001 mol or more relative to 100 parts by mass of the silica.

3. The millable-type silicone rubber composition according to claim 1, wherein the component (C) is an addition-reaction curing agent being a combination of an organohydrogenpolysiloxane and a hydrosilylation catalyst.

4. The millable-type silicone rubber composition according to claim 2, wherein the component (C) is an addition-reaction curing agent being a combination of an organohydrogenpolysiloxane and a hydrosilylation catalyst.

5. The millable-type silicone rubber composition according to claim 1, wherein the component (C) is an organic peroxide curing agent.

6. The millable-type silicone rubber composition according to claim 2, wherein the component (C) is an organic peroxide curing agent.

7. The millable-type silicone rubber composition according to claim 3, wherein the component (C) is an organic peroxide curing agent.

8. The millable-type silicone rubber composition according to claim 4, wherein the component (C) is an organic peroxide curing agent.

9. A silicone rubber cured product, comprising a cured product of the millable-type silicone rubber composition according to claim 1.

10. A silicone rubber cured product, comprising a cured product of the millable-type silicone rubber composition according to claim 2.

11. A silicone rubber cured product, comprising a cured product of the millable-type silicone rubber composition according to claim 3.

12. A silicone rubber cured product, comprising a cured product of the millable-type silicone rubber composition according to claim 4.

13. A silicone rubber cured product, comprising a cured product of the millable-type silicone rubber composition according to claim 5.

14. A silicone rubber cured product, comprising a cured product of the millable-type silicone rubber composition according to claim 6.

15. A silicone rubber cured product, comprising a cured product of the millable-type silicone rubber composition according to claim 7.

16. A silicone rubber cured product, comprising a cured product of the millable-type silicone rubber composition according to claim 8.

* * * * *